United States Patent
Huang et al.

(10) Patent No.: US 11,734,218 B2
(45) Date of Patent: Aug. 22, 2023

(54) BUS SYSTEM

(71) Applicant: Nuvoton Technology Corporation, Hsinchu Science Park (TW)

(72) Inventors: Chih-Hung Huang, New Taipei (TW); Kang-Fu Chiu, Hsinchu (TW); Hao-Yang Chang, Houlong Township, Miaoli County (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 17/581,075

(22) Filed: Jan. 21, 2022

(65) Prior Publication Data

US 2023/0066634 A1    Mar. 2, 2023

(30) Foreign Application Priority Data

Aug. 25, 2021    (TW) ................................ 110131423

(51) Int. Cl.
   *G06F 13/42*      (2006.01)
   *G06F 21/85*      (2013.01)
   *G06F 13/38*      (2006.01)

(52) U.S. Cl.
CPC ........ *G06F 13/4282* (2013.01); *G06F 13/385* (2013.01); *G06F 21/85* (2013.01)

(58) Field of Classification Search
CPC ..... G06F 13/4282; G06F 13/385; G06F 21/85
See application file for complete search history.

(56) References Cited

U.S. PATENT DOCUMENTS

2017/0161497 A1*   6/2017   Jeansonne ........... G06F 12/1458
2018/0267916 A1    9/2018   Mishra et al.
(Continued)

FOREIGN PATENT DOCUMENTS

CN      113111342 A    7/2021
CN      113111343 A    7/2021
(Continued)

OTHER PUBLICATIONS

Taiwanese Office Actions dated Sep. 8, 2022, for the corresponding application No. 110131423 and its search report; pp. 1-13.
(Continued)

*Primary Examiner* — Henry Tsai
*Assistant Examiner* — Aurangzeb Hassan
(74) *Attorney, Agent, or Firm* — Muncy, Geissler, Olds & Lowe, P.C.

(57) ABSTRACT

A bus system is provided. The bus system includes a master device, an enhanced serial peripheral interface (eSPI) bus, an SPI bus, a memory device electrically connected to the master device via the SPI bus, and a plurality of slave devices electrically connected to the master device via the eSPI bus. Each of the slave devices has a pin, and the pins of the slave devices are electrically connected together via a control line. After obtaining program code from the memory device via the master device, a first slave device is configured to decrypt the program code according to a first security code, and transmit the program code decrypted by the first security code to the slave devices via the control line, so that the program code decrypted by the first security code is decrypted in the slave devices according to a decryption sequence.

20 Claims, 9 Drawing Sheets

1A (56) References Cited

U.S. PATENT DOCUMENTS

| | | | |
|---|---|---|---|
| 2019/0227753 A1* | 7/2019 | Zhu | G06F 13/1668 |
| 2019/0236276 A1* | 8/2019 | Hershman | G06F 21/554 |
| 2019/0287588 A1* | 9/2019 | Montero | G06Q 10/00 |
| 2020/0136823 A1* | 4/2020 | Montero | H04L 9/3066 |
| 2020/0326963 A1* | 10/2020 | Bhattacharya | H04L 41/0895 |
| 2021/0328974 A1* | 10/2021 | Grooters | H04L 9/0643 |

FOREIGN PATENT DOCUMENTS

| | | |
|---|---|---|
| CN | 113297603 A | 8/2021 |
| TW | 201717000 A | 5/2017 |
| TW | 201719438 A | 6/2017 |
| TW | 202022628 A | 6/2020 |

OTHER PUBLICATIONS

Office Action dated Apr. 8, 2022 in TW Application No. 110131423 is attached, 13 pages.

\* cited by examiner

BUS SYSTEM

CROSS REFERENCE TO RELATED APPLICATIONS

This application claims priority of Taiwan Patent Application No. 110131423, filed on Aug. 25, 2021, the entirety of which is incorporated by reference herein.

BACKGROUND OF THE INVENTION

Field of the Invention

The invention relates to a bus system, and more particularly to security scheduling of a bus system with multiple slave devices.

Description of the Related Art

In a conventional computer system, a chip set such as a south bridge chip is electrically connected to another external circuit module (such as a system-on-a-chip (SoC) with various functions) through a low pin count (LPC) interface. The external circuit modules coupled through the LPC interface are respectively assigned to different independent addresses. As a result, the south bridge chip can communicate with the external circuit modules using one-to-many communication. However, in recent years, new bus architectures, such as an enhanced serial peripheral interface (eSPI) bus, began only allowing a one-to-one communication mechanism to be employed between a chip set and the external circuit modules. In addition, in the bus architecture, the communication between multiple circuit modules needs to be secure to prevent data from being cracked during transmission.

Therefore, a bus system capable of providing security scheduling for multiple circuit modules is desirable.

BRIEF SUMMARY OF THE INVENTION

Bus systems are provided. An embodiment of a bus system is provided. The bus system includes a master device, an enhanced serial peripheral interface (eSPI) bus, a serial peripheral interface (SPI) bus, a memory device electrically connected to the master device via the SPI bus, and a plurality of slave devices electrically connected to the master device via the eSPI bus. Each of the slave devices has a pin, and the pins of the slave devices are electrically connected together via a control line. After obtaining program code from the memory device via the master device, the first slave device of the slave devices is configured to decrypt the program code according to a first security code, and transmit the program code decrypted by the first security code to the slave devices via the control line, so that the program code decrypted by the first security code is decrypted in the slave devices according to a decryption sequence.

Moreover, an embodiment of a bus system is provided. The bus system includes a master device, an enhanced serial peripheral interface (eSPI) bus, a plurality of slave devices electrically connected to the master device through the eSPI bus, a serial peripheral interface (SPI) bus, and a memory device electrically connected to the slave devices via the SPI bus. Each of the slave devices has a pin, and the pins of the slave devices are electrically connected together via a control line. After obtaining program code from the memory device, the first slave device is configured to decrypt the program code according to a first security code, and transmit the program code decrypted by the first security code to the slave devices via the control line, so that the program code decrypted by the first security code is decrypted in the slave devices according to a decryption sequence.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
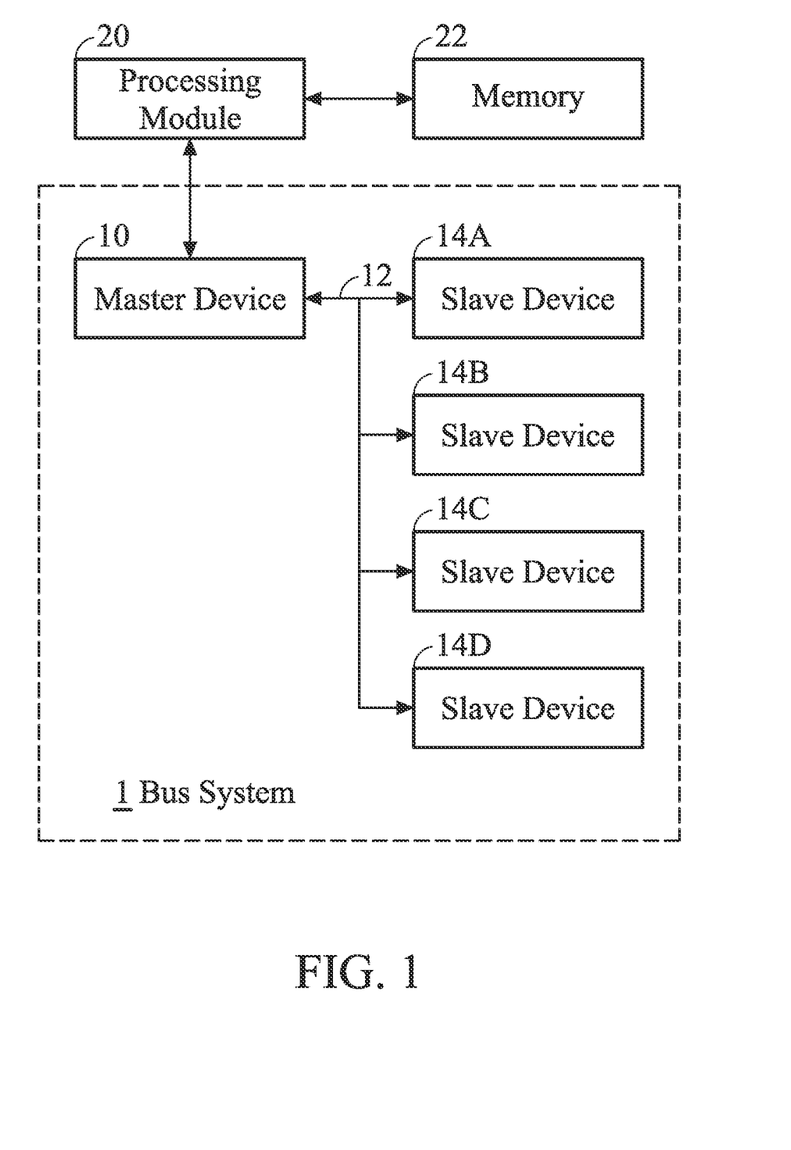
FIG. 1 shows a bus system according to some embodiments of the invention.

FIG. 1 shows a bus system 1 according to some embodiments of the invention. The bus system 1 includes a master device 10, a bus 12, and a plurality of slave devices 14A through 14D. In some embodiments, the master device 10 may be a south bridge chip. In some embodiments, the master device 10 is electrically connected to a processing module 20 of a computer system (not shown), so as to access data with the slave devices 14A through 14D via the bus 12 in response to instructions of the processing module 20. In some embodiments, the processing module 20 is electrically connected to a memory 22 of a computer system, so as to access the memory 22 according to the requirements of different application programs. In some embodiments, the bus 12 may be an enhanced serial peripheral interface (eSPI) bus. The master device 10 is electrically connected to the slave devices 14A through 14D via the bus 12. Furthermore, the master device 10 is configured to perform eSPI communication with the slave devices 14A through 14D by using a one-to-one communication mechanism, and the slave devices 14A through 14D are configured to communicate with the master device 10 by using an arbitration mechanism. It should be noted that the number of slave devices 14A through 14D as illustrated is used as an example, and not to limit the invention.

In some embodiments, the bus 12 includes a reset signal line, a chip select signal line, a clock signal and an input and output signal line (not shown). For example, the master device 10 communicates with the slave devices 14A through 14D by using the chip select signal line of the bus 12 with the one-to-one mechanism. Furthermore, the slave devices 14A through 14D communicate with the master device 10 (e.g., transmitting data and commands) through the input and output signal line of the bus 12 by using the arbitration mechanism. When the master device 10 communicates with the slave devices MA through 14D via the bus 12, the clock signal of the bus 12 is used as a reference clock.

In general, according to the operation mechanism of the chip select signal line, the master device 10 can only select one slave device for communication. However, in the bus system 1, only one of the slave devices 14A through 14D responds to the master device 10 at a time by using the arbitration mechanism. Therefore, when the master device 10 still operates with a one-to-one communication mechanism, the bus 12 can connect the slave devices 14A through 14D to perform communication tasks in response to the chip select signal line, thereby increasing the expandability of the bus system 1.

Figure 2:
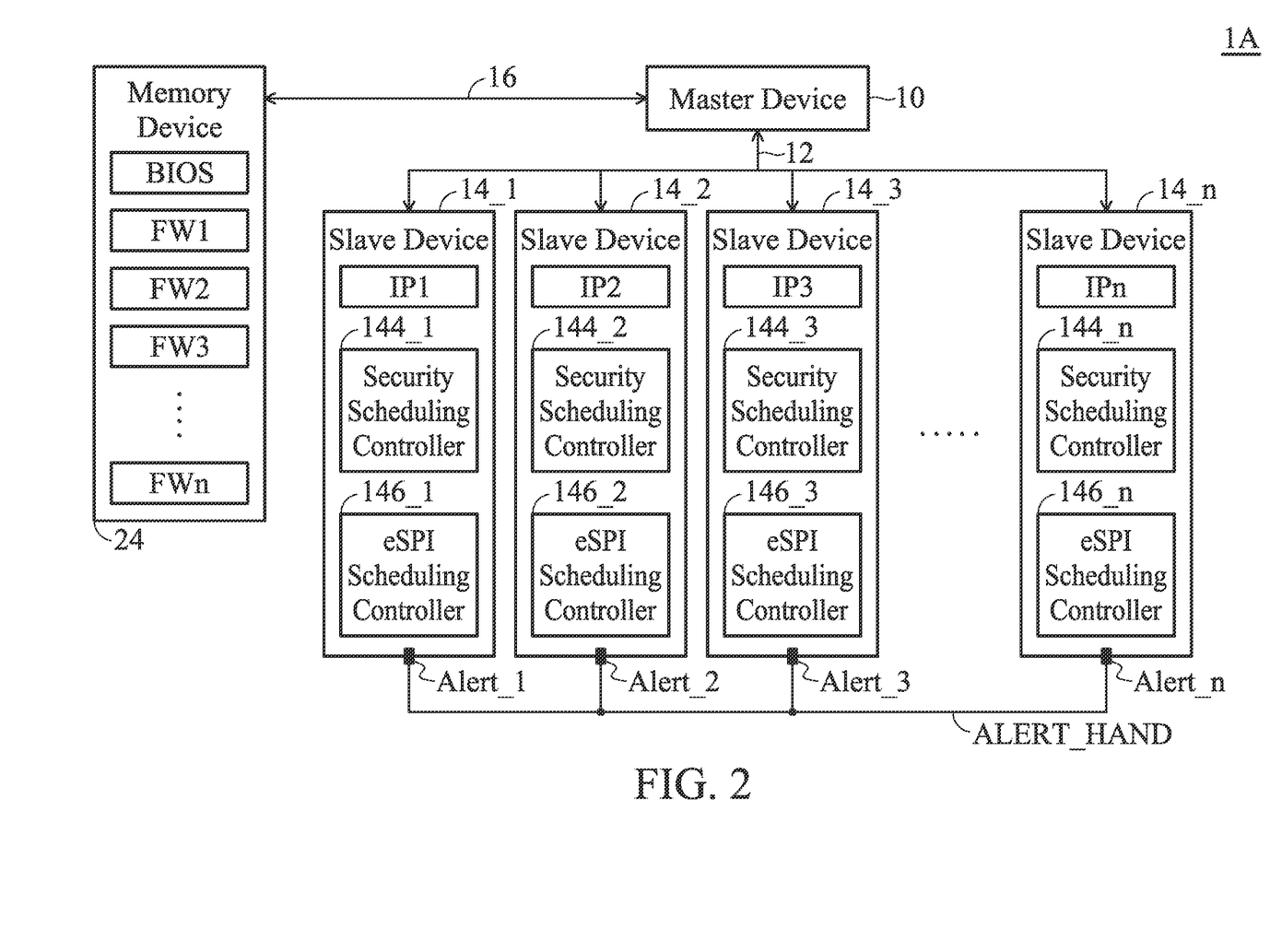
FIG. 2 shows a bus system according to some embodiments of the invention.

FIG. 2 shows a bus system 1A according to some embodiments of the invention. The master device 10 is electrically connected to the slave devices 14_1 through 14_n via the bus 12. As described above, the bus 12 is an eSPI bus. In addition, the master device 10 is electrically connected to the memory device 24 via the bus 16. In FIG. 2, the bus 16 is an SPI bus, and the memory device 24 is a flash memory. Furthermore, the memory device 24 is configured to store the basic input and output system (BIOS) of the master device 10 and the program codes of firmware FW1 through FWn of the slave devices 14_1 through 14_n. In some embodiments, the BIOS of the master device 10 and the firmware FW1 through FWn of the slave devices 14_1 through 14_n are stored in different memory devices.

In FIG. 2, the alert handshake pins Alert_1 through Alert_n of the slave devices 14_1 through 14_n are electrically connected to the alert-handshake control line ALERT_HAND. In some embodiments, the alert-handshake control line ALERT_HAND is electrically connected to the power supply VDD (not shown) through a pull-up resistor (not shown), so that the alert-handshake control line ALERT_HAND is at a high voltage level (e.g., a high logic signal "H"). In some embodiments, the alert-handshake control line ALERT_HAND is electrically connected to the ground GND (not shown) through a pull-down resistor (not shown), so that the alert-handshake control line ALERT_HAND is at a low voltage level (e.g., a low logic signal "L"). In some embodiments, the alert handshake pins Alert_1 through Alert_n are bi-directional input/output pins, and are open-drain in the output mode.

In FIG. 2, each of slave devices 14_1 through 14_n includes its own eSPI scheduling controller 146_1 through 146_n. Taking the slave device 14_1 as an example, the eSPI scheduling controller 146_1 of the slave device 14_1 is configured to control the slave device 14_1 to perform eSPI communication with the master device 10 via the bus 12. For example, when the slave device 141 communicates with the master device 10, the eSPI scheduling controller 146_1 is configured to control the slave device 14_1 to receive instructions and data from the master device 10 via the bus 12, and provide the corresponding data to the master device 10. Moreover, the eSPI scheduling controllers 146_1 through 146_n in the slave devices 14_1 through 14_n are configured to control the corresponding alert handshake pins Alert_1 through Alert_n to a specific voltage level (e.g., a low logic signal "L" or a high logic signal "H") so as to drive the alert-handshake control line ALERT_HAND so that the alert-handshake control line ALERT_HAND is at the specific voltage level (e.g., a low voltage level or a high voltage level). Therefore, each of slave devices 14_1 through 14_n is configured to obtain the right to actively communicate with the master device 10 by controlling the voltage level of the alert-handshake control line ALERT_HAND.

Furthermore, each of slave devices 14_1 through 14_n further includes its own security scheduling controllers 144_1 through 144_n and the corresponding security codes IP1 through IPn. In some embodiments, the security codes IP1 through IPn are completely different. In some embodiments, a part of the security codes IP1 through IPn are the same.

Taking the slave device 14_1 as an example, the security scheduling controller 144_1 of the slave device 14_1 is configured to control the slave device 14_1 to perform secure communication with the other slave devices 14_2 through 14_n and/or the peripheral devices (not shown) via the alert-handshake control line ALERT_HAND. For example, in the slave device 14_1, the security scheduling controller 144_1 is configured to encrypt or decrypt the data according to the security code IP1, and then transmit the encrypted or decrypted data to the corresponding slave device via the alert-handshake control line ALERT_HAND. In some embodiments, the security codes IP1 through IPn are pre-stored security codes, keys, or identification codes. Moreover, the slave devices 14_1 through 14_n can use known security algorithms to perform multiple encryption/decryption processing on data.

In the bus system 1A, the slave device 14_1 is configured to first drive the alert-handshake control line ALERT_HAND via the alert handshake pin Alert_1 to obtain the right to actively communicate with the master device 10. Next, the slave device 14_1 is configured to issue an interrupt request to the master device 10 via the bus 12, so as to request the master device 10 to retrieve the encrypted firmware FW1 of the slave device 14_1 from the memory device 24, and transmit the encrypted firmware FW1 to the slave device 14_1. After receiving the encrypted firmware FW1 via the bus 12, the security scheduling controller 144_1 of the slave device 14_1 is configured to decrypt the encrypted firmware FW1 according to the security code IP1, and perform the subsequent decryption (or decoding) procedures. For example, for the firmware FW1 from the master device 10, the security scheduling controller 144_1 is configured to transmit the firmware FW1 decrypted by the security code IP1 to the specific slave device via the alert-handshake control line ALERT_HAND to continue the decryption. Next, when receiving the firmware FW1 from the slave device 14_1 that has been decrypted by the security code IP1, the security scheduling controller of the specific slave device is configured to use its own security code to decrypt the firmware FW1, and transmit the decrypted firmware FW1 via the alert-handshake control line ALERT_HAND to other slave devices to continue the decryption.

It should be noted that the order of delivery in which the firmware FW1 is transmitted between the slave devices 14_1 through 14_n via the alert-handshake control line ALERT_HAND is determined by the encryption sequence of the firmware FW1. Furthermore, the decryption sequence is opposite to the encryption sequence, and the encryption sequence/decryption sequence will be described later. In addition, the encryption sequence/decryption sequence can be adjusted according to actual applications. Finally, the decrypted firmware FW1 will be transmit back to the slave device 14_1 via the alert-handshake control line ALERT_HAND, and then the slave device 14_1 is configured to use the security code IP1 to finally decrypt the received firmware FW1, so as to restore the firmware FW1. After the decryption of the firmware FW1 is completed, the slave device 14_1 is configured to store the firmware FW1 and perform the corresponding operations according to the firmware FW1.

Similarly, other slave devices 14_2 through 14_n can also issue interrupt requests to the master device 10, so as to request the master device 10 to transmit its own firmware. The firmware is also be transferred and decrypted in a specific decryption sequence between the slave devices 14_1 through 14_n via the alert-handshake control line ALERT_HAND. Therefore, all the slave devices 14_1 through 14_n can obtain the decrypted firmware FW1 through FWn.

In the embodiments of the invention, the slave devices 14_1 through 14_n transmitting the encrypted and/or decrypted data on the alert-handshake control line ALERT_HAND is just an example. In other embodiments, the slave devices 14_1 through 14_n can transmit the encrypted and/or decrypted data on other signal lines, such as serial signal lines such as I2C, UART, and SPI.

The following will give examples of various encryption algorithms used by the bus system 1A. It should be noted that the algorithms described below are merely illustrative, and the invention is not limited to the exemplified algorithms.

Triple data encryption standard (3DES) (or called triple data encryption algorithm (TDEA)) is a symmetric-key encryption algorithm. The 3DES algorithm encrypts one data through the DES algorithm three times, and each encryption uses a different key, so as to obtain higher encryption security than the general DES algorithm. The operation of the 3DES algorithm can be expressed as the following formula (1):

$$Y=E_3(E_2(E_1(X))) \quad (1),$$

where E represents the operation of encryption, X is the original data and Y is the encrypted data after the 3DES algorithm. In addition, the encryption sequence of 1, 2, and 3 is only an example, and is not intended to limit the present invention.

In some embodiments, in order to use different security codes IP for encryption and eventually return to the original owner of the firmware, the formula (1) can be rewritten as the following formula (2):

$$Y_1=E_1(E_3(E_1(X_1))) \quad (2),$$

wherein it is assumed that the slave device 14_1 is a slave device corresponding to the firmware (e.g., the firmware FW1), and the slave device 14_3 is another slave device that assists in performing the encryption (hereinafter also referred to as a specific slave device). Therefore, the encryption sequence is from the slave device 14_1 to the slave device 14_3, and then back to the slave device 14_1. In other words, the encrypted firmware FW1 (i.e., $Y_1$) stored in the memory device 24 is encrypted by the firmware $X_1$ of the slave device 14_1 with the security code IP1 of the slave device 14_1, and then encrypted by the security code IP3 of the slave device 14_3, and then the firmware $X_1$ is generated after the security code IP1 of the slave device 14_1 is encrypted. Therefore, the encrypted firmware FW1 stored in the memory device 24 can be decrypted by the following formula (3):

$$X1=D_1(D_3(D_1(Y_1))) \quad (3),$$

where D represents the operation of decryption. In other words, the encrypted firmware FW1 (i.e., $Y_1$) stored in the memory device 24 needs to be decrypted by the security code IP1 of the slave device 14_1, and then decrypted by the security code IP3 of the slave device 14_3, and finally decrypted by the security code IP1 of the slave device 14_1, so that the firmware FW1 (i.e., $Y_1$) can be restored to the original firmware $X_1$ of the slave device 14_1.

Figure 3:
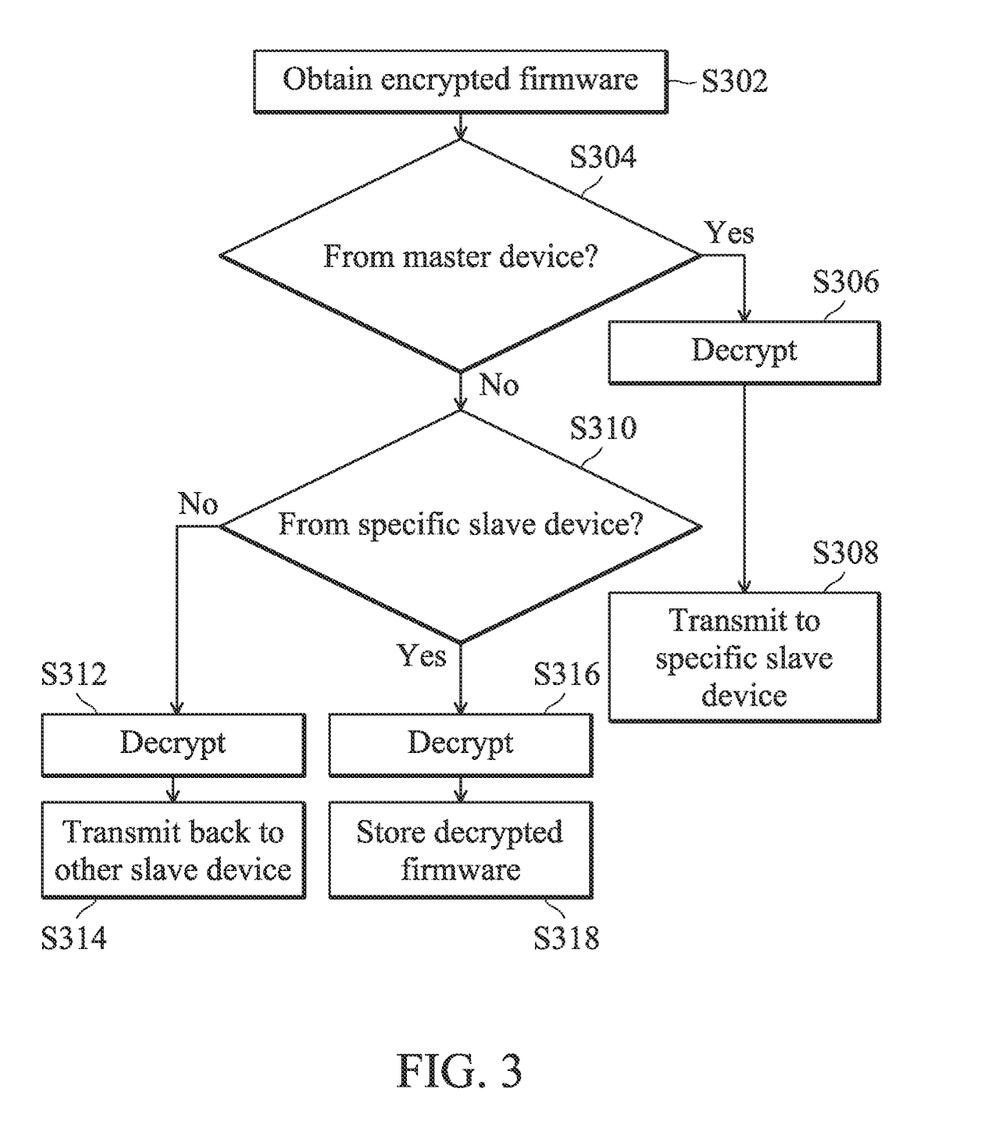
FIG. 3 shows a security scheduling control method for 3DES decryption of the bus system according to some embodiments of the invention.

FIG. 3 shows a security scheduling control method for 3DES decryption of the bus system 1A according to some embodiments of the invention. The security scheduling control method of FIG. 3 can be executed by each of the security scheduling controllers 144_1 through 144_n of the slave devices 14_1-14_n in the bus system 1A.

First, in step S302, one of the slave devices is configured to obtain the encrypted firmware. Next, in step S304, the slave device is configured to determine whether the encrypted firmware is provided by the master device 10 via the bus 12. In some embodiments, in step S304, the slave device is configured to determine whether the encrypted firmware comes from the memory device 24. If the encrypted firmware is provided by the master device 10, the slave device is configured to decrypt the received encrypted firmware according to its own security code IP (step S306), and transmit the firmware decrypted by the security code IP to a specific slave device (e.g., the $K^{th}$ slave device) (step S308) according to the decryption sequence for subsequent decryption procedures. If the encrypted firmware is not provided by the master device 10, the slave device is configured to further determine whether the encrypted firmware is provided by the specific slave device (step S310). If the encrypted firmware is provided by another slave device (e.g., the $M^{th}$ slave device) via the alert-handshake control line ALERT_HAND, the slave device is configured to decrypt the received firmware according to its own security code IP (step S312), and transmit the firmware decrypted by the security code IP back to other subordinate device (e.g., back to the $M^{th}$ slave device) according to the decryption sequence (step S314) for subsequent decryption procedures. Conversely, if the encrypted firmware is provided by the specific slave device via the alert-handshake control line ALERT_HAND, the slave device is configured to decrypt the received encrypted firmware according to its own security code IP (step S316). Then, all decryption steps of the firmware are completed, and the restored firmware is stored in the slave device (step S318). Next, the slave device is configured to perform the corresponding operation according to the stored firmware.

Figure 4:
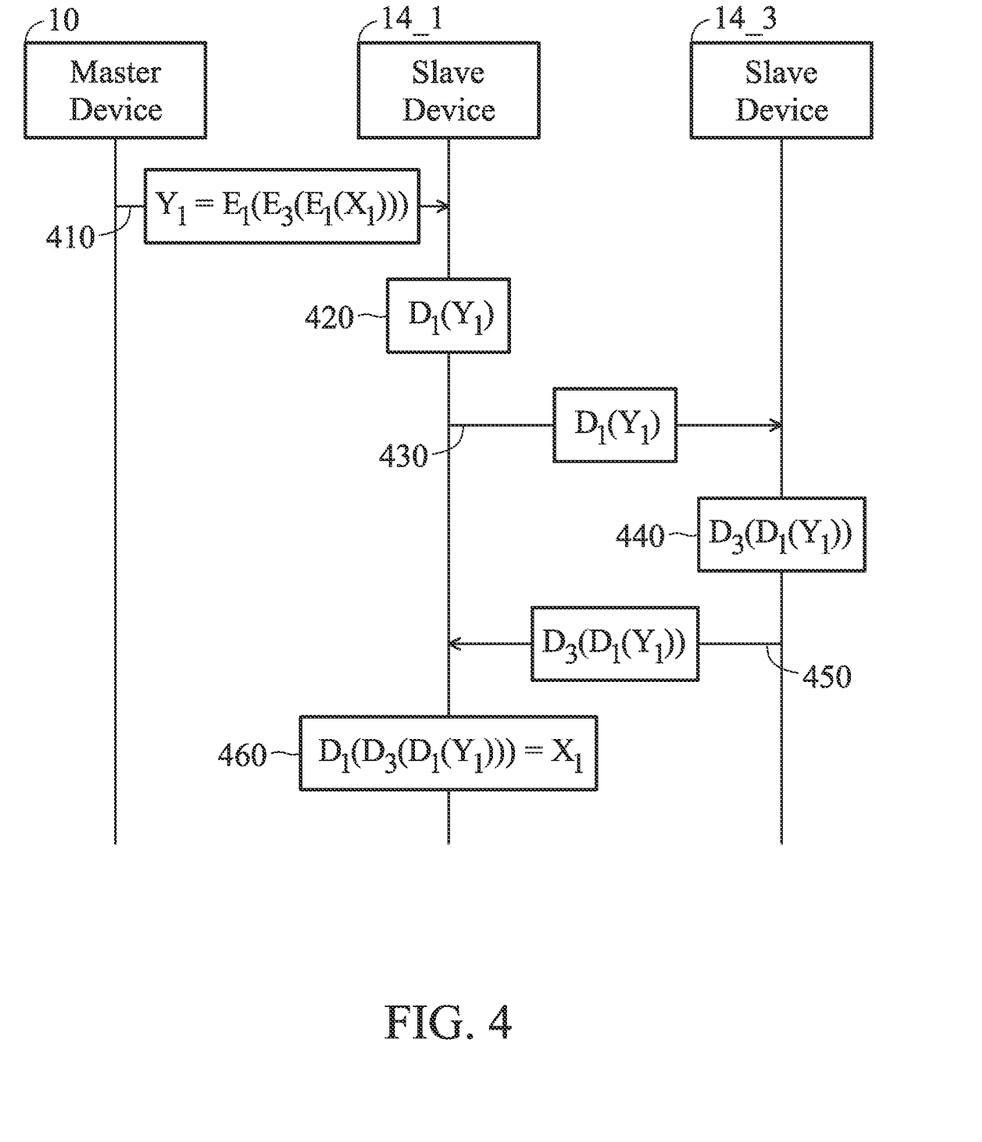
FIG. 4 shows a message sequence chart (MSC) of the security scheduling control method of FIG. 3 executed by the bus system according to some embodiments of the invention.

FIG. 4 shows a message sequence chart (MSC) of the security scheduling control method of FIG. 3 executed by the bus system 1A according to some embodiments of the invention.

Referring to FIGS. 3 and 4 together, first, the slave device 14_1 is configured to issue an interrupt request to the master device 10, so as to obtain the encrypted firmware $Y_1$ (i.e., FW1) stored in the memory device 24 via the master device 10, as shown in label 410. Since the encrypted firmware $Y_1$ comes from the master device 10/memory device 24 (step S304), the slave device 14_1 is configured to use the security code IP1 to decrypt the firmware $Y_1$ for first decryption (step S306) to obtain the firmware $D_1(Y_1)$, as shown in label 420.

Next, according to the decryption sequence, the specific slave device can be obtained as the slave device 14_3, so the slave device 14_1 is configured to transmit the firmware $D_1(Y_1)$ to the slave device 143 via the alert-handshake control line ALERT_HAND (step S308), as shown in label 430. Next, in response to the received firmware $D_1(Y_1)$, the slave device 14_3 is configured to use the security code IP3 to decrypt the firmware $D_1(Y_1)$) for second decryption (step S312) to obtain the firmware $D_3(D_1(Y_1))$, As shown in label 440. Next, according to the decryption sequence, the slave device 14_3 is configured to transmit the firmware $D_3(D_1(Y_1))$ back to the slave device 14_1 via the alert-handshake control line ALERT_HAND (step S314), as shown in label 450. When the slave device 14_1 receives the firmware $D_3(D_1(Y_1))$ from the slave device 14_3, the slave device 14_1 is configured to use the security code IP1 to decrypt the firmware $D_3(D_1(Y_1))$ for the last decryption (step S316), so as to obtain the decrypted firmware $X_1$, as shown in label 460. Therefore, the firmware $Y_1$ has completed all the required decryption procedures and restored to firmware $X_1$. Next, the slave device 14_1 is configured to store the firmware $X_1$ in its own storage (such as a memory), and perform the corresponding operations according to the stored firmware $X_1$.

Polyalphabetic cipher is an alternative encryption algorithm, which uses a different cipher table for each replacement and uses these cipher tables in a specific sequence. When the number of replacements exceeds the number set in the specific sequence, the specific sequence will be used to replace the cipher again in order to achieve higher security than the general replacement algorithm. The calculation method of polyalphabetic cipher can be expressed as the following formula (4):

$$Y = \ldots E_1(E_3(E_2(E_4(E_1(X))))) \quad (4),$$

where E represent the operation of encryption, X is the original data and Y is the encrypted data after the polyalphabetic cipher algorithm. In addition, the sequence of encryption as 1, 4, 2, 3 and 1 is just an example, and is not intended to limit the invention.

In some embodiments, in order to use the different securities IPs for encryption and eventually return to the original owner of the firmware, the formula (4) can be rewritten as the following formula (5):

$$Y_1 = E_1(\ldots\ldots E_1(E_3(E_2(E_4(E_1(X_1))))) \ldots\ldots). \quad (5)$$
$$\mid \longleftarrow \text{loop t times} \longrightarrow \mid$$

It is assumed that the slave device 14_1 represents the slave device corresponding to the firmware (e.g., the firmware FW1), and the slave devices 14_2 through 14_4 represent other slave devices that assist in performing the encryption. In other words, the encrypted firmware FW1 (i.e., $Y_1$) stored in the memory device 24 is encrypted by the firmware $X_1$ of the slave device 14_1 with the security code IP1 of the slave device 14_1, and then sequentially encrypted by the security code IP4 of the slave device 144, the security code IP2 of the slave device 14_2 and the security code IP3 of the slave device 14_3 (that is, the specific slave device), and then is encrypted by the security code IP1 of the slave device 14_1. After t cycles, finally, it is encrypted with the security code IP1 of the slave device 14_1 to obtain the encrypted firmware $Y_1$, where t can be any integer. In some embodiments, the number of cycles is determined according to actual applications. Therefore, the encrypted firmware FW1 stored in the memory device 24 can be decrypted by the following formula (6):

$$X_1 = D_1(\ldots\ldots D_1(D_4(D_2(D_3(D_1(Y_1))))) \ldots), \quad (6)$$
$$\mid \longleftarrow \text{loop t times} \longrightarrow \mid$$

where D is the operation of decryption. In other words, the encrypted firmware FW1 (i.e., $Y_1$) stored in the memory device 24 needs to be decrypted by the security code IP1 of the slave device 14_1, and then sequentially decrypted by the security code IP3 of the slave device 14_3, the security code IP2 of the slave device 14_2, and the security code IP4 of the slave device 14_4 and looped t times. Finally, after the decryption by the security code IP1 of the slave device 14_1, the firmware FW1 (i.e., $Y_1$) can be restored to the original firmware $X_1$ of the slave device 14_1.

Figure 5:
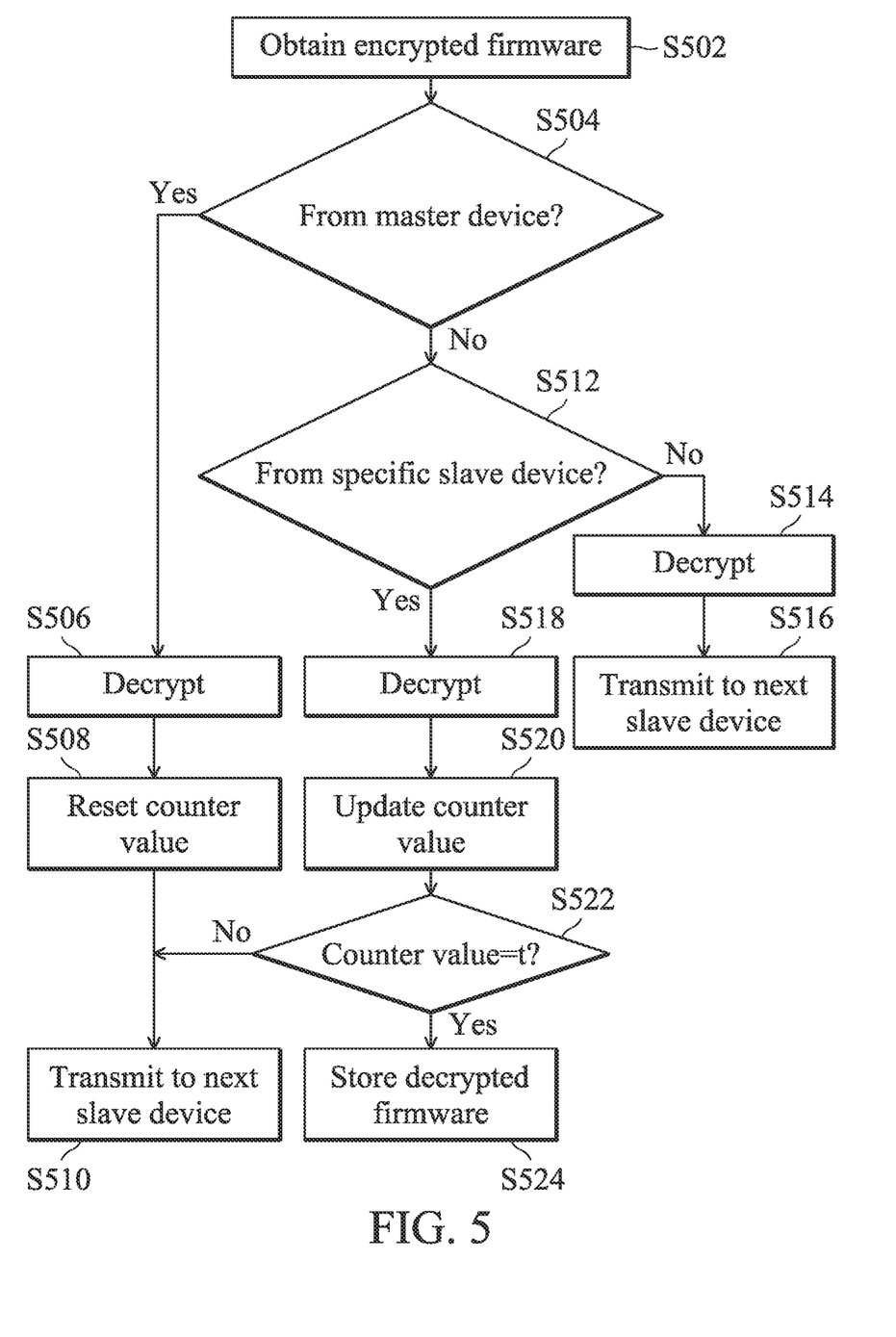
FIG. 5 shows a security scheduling control method for polyalphabetic cipher of the bus system according to some embodiments of the invention.

FIG. 5 shows a security scheduling control method for polyalphabetic cipher of the bus system 1A according to some embodiments of the invention. The security scheduling control method of FIG. 5 can be executed by each of the security scheduling controllers 144_1 through 144_n of the slave devices 14_1 through 14_n in the bus system 1A.

First, in step S502, one of the slave devices is configured to receive the encrypted firmware. Next, in step S504, the slave device is configured to determine whether the encrypted firmware is provided by the master device 10 via the bus 12 (step S504). In some embodiments, in step S504, the slave device is configured to determine whether the encrypted firmware comes from the memory device 24. If the encrypted firmware is provided by the master device 10, the slave device is configured to decrypt the received encrypted firmware according to its own security code IP (step S506), and reset the counter value CO to 0 (step S508), i.e., CO=0. Next, the slave device is configured to transmit the firmware decrypted by the security code IP to the next slave device according to the decryption sequence (step S510), so as to perform the subsequent decryption procedures. Conversely, if the encrypted firmware is not provided by the master device 10, the slave device is configured to further determine whether the encrypted firmware is provided by a specific slave device (step S512). If the encrypted firmware is provided by other slave devices, i.e., not provided by the specific slave device, via the alarm-handshake control line ALERT_HAND, the slave device is configured to decrypt the received firmware according to its own security code IP (step S514), and transmit the firmware decrypted by the security code IP to the next slave device according to the decryption sequence (step S516) for subsequent decryption procedures. Conversely, if the encrypted firmware is provided by the specific slave device via the alert-handshake control line ALERT_HAND, the received encrypted firmware is decrypted according to its own security code IP (step S518). Next, the counter value CO is increased by one to update the counter value CO (step S520), that is, CO=CO+1, and it is determined whether the updated counter value CO is equal to the number of cycles t (step S522). If the counter value CO is not equal to the number of cycles t (e.g., CO<t), the slave device is configured to transmit the firmware decrypted by the security code IP to the next slave device according to the decryption sequence (step S510), so as to perform the subsequent decryption procedures. If the counter value CO is equal to the number of cycles t (i.e., CO=t), all decryption steps of the firmware are completed, and the restored firmware is stored in the slave device (step S524). Next, the slave device is configured to perform the corresponding operation according to the stored firmware.

Figure 6:
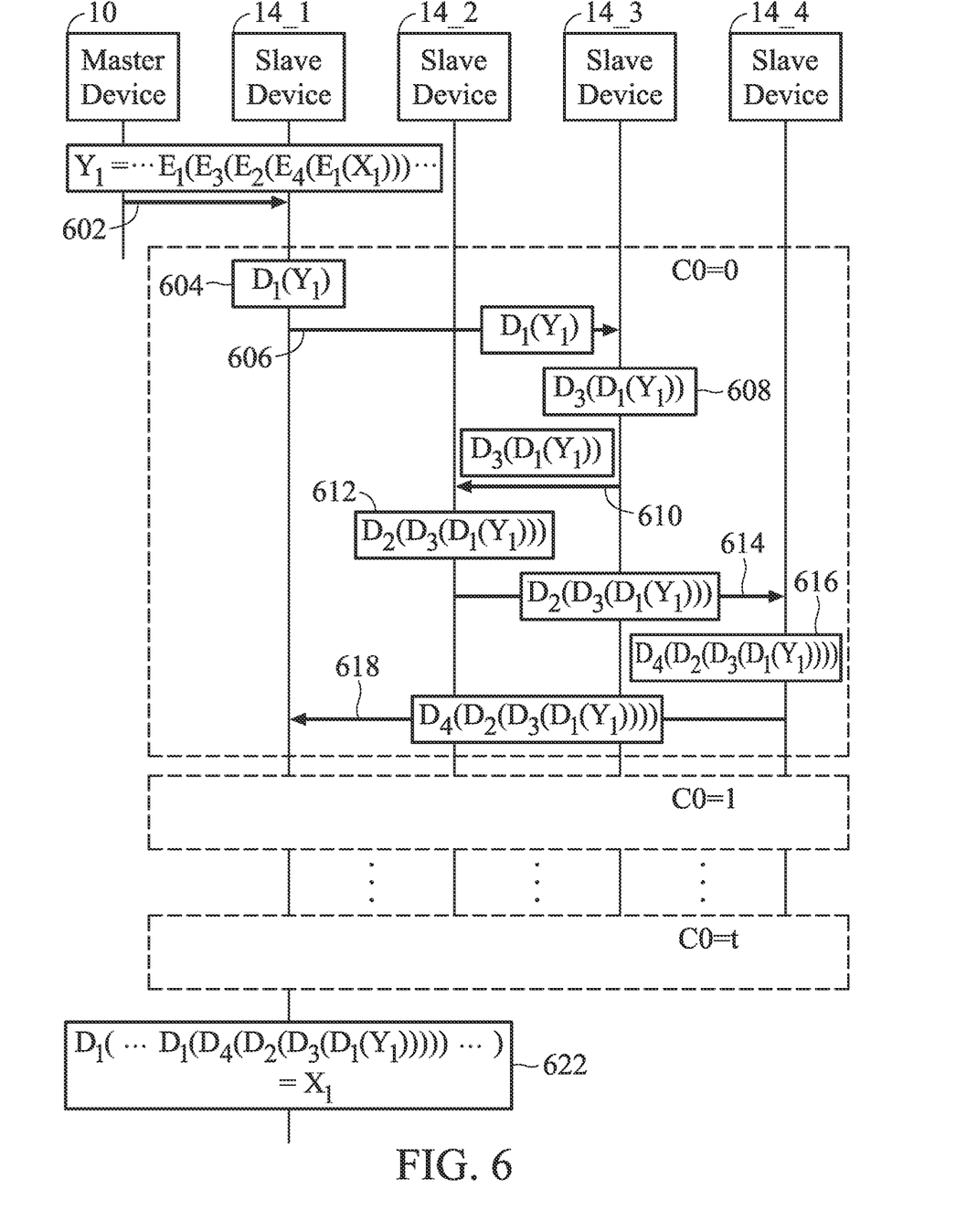
FIG. 6 is a message sequence chart of the bus system executing the security scheduling control method of FIG. 5 according to some embodiments of the invention.

FIG. 6 is a message sequence chart of the bus system 1A executing the security scheduling control method of FIG. 5 according to some embodiments of the invention.

Referring to FIGS. 5 and 6 together, first, the slave device 14_1 issues an interrupt request to the master device 10, so as to obtain the encrypted firmware $Y_1$ (i.e., FW1) stored in the memory device 24 through the master device 10, as shown in label 602. Since the encrypted firmware $Y_1$ comes from the master device 10/memory device 24 (step S504), the slave device 14_1 is configured to use the security code IP1 to decrypt the firmware $Y_1$ (step S506) to obtain the firmware $D_1(Y_1)$, such shown in label 604. Next, the slave device 14_1 is configured to reset the counter value CO to 0 (step S508), that is, CO=0, and transmit the firmware $D_1(Y_1)$ to the slave device 14_3 via the alert-handshake control line ALERT_HAND according to the decryption sequence (step S510), as shown in label 606. Next, for the slave device 14_3, the slave device 14_1 is not the corresponding specific slave device, so the slave device 14_3 is configured to use the security code IP3 to decrypt the firmware $D_1(Y_1)$ (step S514) to obtain the firmware $D_3(D_1(Y_1))$, as shown in label 608. Next, according to the decryption sequence, the slave device 14_3 is configured to transmit the firmware $D_3(D_1(Y_1))$ to the slave device 14_2 via the alert-handshake control line ALERT_HAND (step S516), as shown in label 610. Next, the slave device 14_2 is configured to use the security code IP2 to decrypt the firmware $D_3(D_1(Y_1))$ (step S514) to obtain the firmware $D_2(D_3(D_1(Y_1)))$, as shown in label 612.

Next, according to the decryption sequence, the slave device 14_2 is configured to transmit the firmware $D_2(D_3(D_1(Y_1)))$ to the slave device 144 via the alert-handshake control line ALERT_HAND (step S516), as shown in label 614. Next, the slave device 14_4 is configured to use the security code IP4 to decrypt the firmware $D_2(D_3(D_1(Y_1)))$ (step S514) to obtain the firmware $D_4(D_2(D_3(D_1(Y_1))))$, as shown in label 616. Next, according to the decryption sequence, the slave device 144 is configured to transmit the firmware $D_4(D_2(D_3(D_1(Y_1))))$ to the slave device 141 via the alert-handshake control line ALERT_HAND (step S516), as shown in label 618. When the slave device 141 receives the firmware $D_4(D_2(D_3(D_1(Y_1))))$ from the slave device 14_4 (the specific slave device), the slave device 14_1 is configured to use the security code IP1 to decrypt the firmware $D_4(D_2(D_3(D_1(Y_1))))$ so as to obtain firmware $D_1(D_4(D_2(D_3(D_1(Y_1)))))$ (step S518), and the counter value CO is updated to 1 (step S520). Since the counter value CO is not equal to the number of cycles t (step S522), the slave device 14_1 is configured to transmit the firmware $D_1(D_4(D_2(D_3(D_1(Y_1)))))$ to the slave device 14_3 according to the decryption order (step S510) so as to perform the next cycle of decryption until the counter value CO is equal to the number of cycles t. Therefore, the firmware $Y_1$ has completed all the required decryption procedures and restored to the firmware $X_1$, as shown in label 622. Next, the slave device 14_1 is configured to store the firmware $X_1$ in its own storage (e.g., the memory), and perform the corresponding operations according to the stored firmware X1.

Salt encryption is an algorithm used to encrypt data multiple times, which can add a different salt value before each encryption, making the encrypted data more chaotic and not easy to be cracked, so as to provide higher security than the general multiple encryption algorithm. The calculation method of salt encryption can be expressed as the following formula (7):

$$Y = E_1(E_1( \ldots E_1(E_1(X+S_1)+S_2) \ldots )+S_t) \qquad (7),$$

where E represents the operation of encryption, X is the original data, and Y is the encrypted data after the salted encryption algorithm. In addition, S represents the salt value added during encryption, and t represents the number of encryptions.

In some embodiments, the salt value S may be set as the next slave device that needs to be known during decryption, and the salt value S is required to be 0 for the last time to determine that the decryption has been completed. In other words, the decryption sequence can be known from the salt value S. In other embodiments, the salt value S of different functions can be designed in a suitable manner.

In some embodiments, in order to use different security codes IP for encryption and eventually return to the original owner of the firmware, the formula (7) can be rewritten as the following formula (8):

$$Y1 = E_1(E_3( \ldots E_4(E_1(E_3(E_2(E_4(E_1(X_1)+0)+1)+4)+2)+3)+1) \ldots )+3) \qquad (8)$$

It is assumed that the slave device 14_1 represents the slave device corresponding to the firmware (e.g., the firmware FW1), and the slave devices 14_2 through 14_4 represent other slave devices that assist in performing the encryption. Moreover, the encryption sequence as 1, 4, 2, 3 and 1 is just an example, and is not intended to limit the invention. Furthermore, the first salt value S is set to 0, which can be used to determine whether the decryption is finished. In other words, the encrypted firmware FW1 (i.e., $Y_1$) stored in the memory device 24 is added with the salt value (0) by the firmware $X_1$ of the slave device 14_1, i.e., the salt value S=0, and is encrypted by the security code IP1 of the slave device 14_1. Next, after adding the salt value (1), i.e., the salt value S=1, it is encrypted by the security code IP4 of the slave device 14_4. Next, after adding the salt value (4), i.e., the salt value S=4, it is encrypted by the security code IP2 of the slave device 142. Next, after adding the salt value (2), i.e., the salt value S=2, it is encrypted by the security code IP3 of the slave device 14_3. Next, after adding the salt value (3), i.e., the salt value S=3, it is encrypted by the security code IP1 of the slave device 14_1. Similar to the way of polyalphabetic cipher, the salt encryption algorithm can also loop a specific number of times, i.e., the number of cycles t. After t cycles, the data encrypted by the security code IP3 of the slave device 14_3 will be added with a salt value (3). Finally, the encrypted firmware $Y_1$ is obtained by encrypting by the security code IP1 on of the slave device 14_1, where t can be any integer. In some embodiments, the number of cycles can be determined according to actual applications. Therefore, the encrypted firmware $FW_1$ stored in the memory device 24 can be decrypted by the following formula (9):

$$X1 = D_1(D_4( \ldots D_3(D_1(D_4(D_2(D_3(D_1(Y_1)-3)-2)-4)-1)-3) \ldots )-1)-0 \qquad (9),$$

where D represents the operation of decryption.

In other words, the encrypted firmware FW1 (i.e., $Y_1$) stored in the memory device 24 needs to be decrypted by the security code IP1 of the slave device 14_1, and the salt value (3) is obtained in order to transmit the firmware decrypted by the security code IP1 to the slave device 14_3 corresponding to the salt value (3). Similarly, after the decryption by the security code IP3 of the slave device 14_3, the salt value (2) is obtained, and then the firmware decrypted by the security code IP3 is transmitted to the slave device 14_2 corresponding to the salt value (2), and so on. Finally, after the decryption by the security code IP1 of the slave device 14_1, the salt value (0) is obtained, so that the firmware FW1 (i.e., $Y_1$) is restored to the original firmware ($X_1$) of the slave device 14_1.

Figure 7:
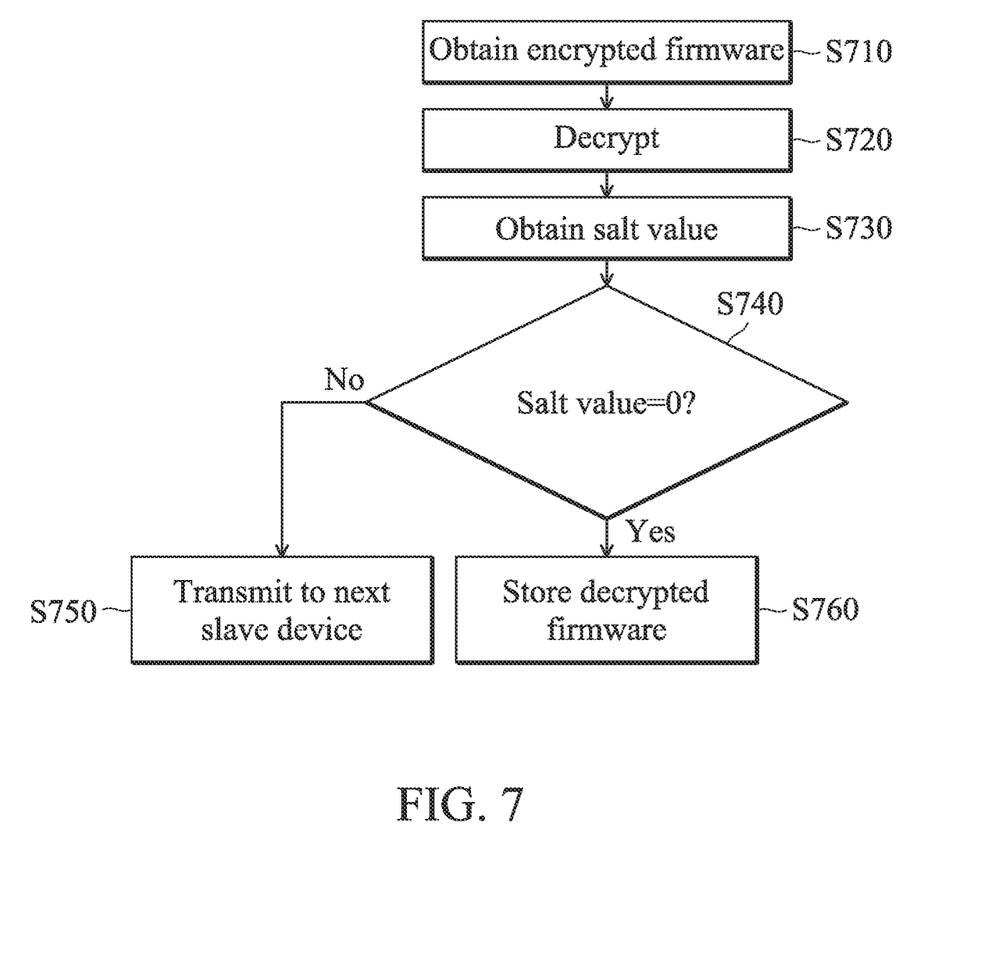
FIG. 7 shows a security scheduling control method for salt encryption of the bus system according to some embodiments of the invention.

FIG. 7 shows a security scheduling control method for salt encryption of the bus system 1A according to some embodiments of the invention. The security scheduling control method of FIG. 7 can be executed by each of the security scheduling controllers 144_1 through 144_n of the slave devices 14_1 through 14_n in the bus system 1A.

First, in step S710, one of the slave devices is configured to receive the encrypted firmware. Next, the slave device is configured to decrypt the received firmware according to its security code IP (step S720), and obtain/retrieve the salt value S from the firmware decrypted by the security code IP (step S730). In some embodiments, the salt value S is obtained from a specific bit of the firmware. Next, in step S740, the slave device is configured to determine whether the salt value S is zero. If the salt value S is not 0, the slave device is configured to transmit the firmware decrypted by the security code IP to the slave device corresponding to the salt value S (step S750) for subsequent decryption procedures. If the salt value S is 0, all decryption steps of the firmware are completed, and the restored firmware is stored in the slave device (step S760). Next, the slave device is configured to perform the corresponding operation according to the stored firmware.

Figure 8:
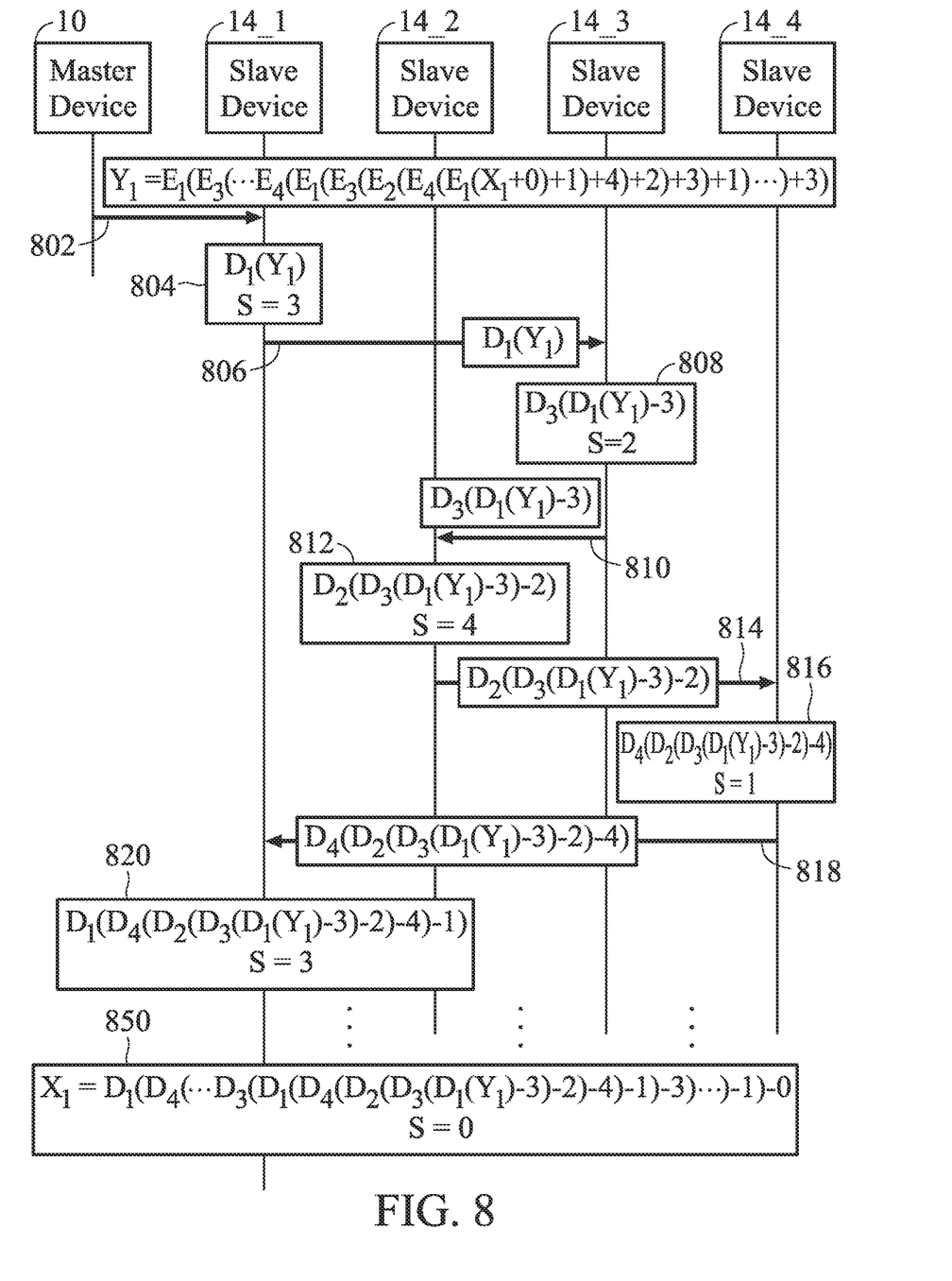
FIG. 8 is a message sequence chart of the bus system executing the security scheduling control method of FIG. 7 according to some embodiments of the invention.

FIG. 8 is a message sequence chart of the bus system 1A executing the security scheduling control method of FIG. 7 according to some embodiments of the invention.

Referring to FIGS. 7 and 8 together, first, the slave device 14_1 is configured to issue an interrupt request to the master device 10, so as to obtain the encrypted firmware $Y_1$ (i.e., the firmware FW1) stored in the memory device 24 through the master device 10, as shown in label 802. Next, the slave device 14_1 is configured to use the security code IP1 to decrypt the firmware $Y_1$ (step S720) to obtain the firmware $D_1(Y_1)$, and obtain the salt value S from the firmware $D_1(Y_1)$ as 3 (step S730), as shown in label 804. Next, the slave device 14_1 is configured to transmit the firmware $D_1(Y_1)$ to the slave device 14_3 via the alert-handshake control line ALERT_HAND according to the salt value S of 3 (step S750), as shown in label 806. Next, the slave device 14_3 is configured to use the security code IP3 to decrypt the firmware $D_1(Y_1)$ that removes the known salt value S (step S720) so as to obtain the firmware $D_3(D_1(Y_1)-3)$, and the salt value S obtained from the firmware $D_3(D_1(Y_1)-3)$ is 2 (step S730), as shown in label 808. In some embodiments, each slave device first is configured to remove the firmware with the known salt value S, and then transmit the firmware that the salt value has removed to the next slave device.

Next, the slave device 14_3 is configured to transmit the firmware $D_3(D_1(Y_1)-3)$ to the slave device 14_2 via the alert-handshake control line ALERT_HAND according to the salt value S of 2 (step S750), as shown in label 810. Next, the slave device 14_2 is configured to use the security code IP2 to decrypt the firmware $D_3(D_1(Y_1)-3)$ that removes the known salt value S of 2, so as to obtain the firmware $D_2(D_3(D_1(Y_1)-3)-2)$ and get a salt value S of 4 from the firmware $D_2(D_3(D_1(Y_1)-3)-2)$, as shown in label 812. Next, the slave device 14_2 is configured to transmit the firmware $D_2(D_3(D_1(Y_1)-3)-2)$ to the slave device 14_4 via the alert-handshake control line ALERT_HAND according to the salt value S of 4, as shown in label 814. Next, the slave device 14_4 is configured to use the security code IP4 to decrypt the firmware $D_2(D_3(D_1(Y_1)-3)-2)$ that removes the known salt value S of 4, so as to obtain the firmware $D_4(D_2(D_3(D_1(Y_1)-3)-2)-4)$ and obtain a salt value S of 1 from the firmware $D_4(D_2(D_3(D_1(Y_1)-3)-2)-4)$, as shown in label 816. Next, the slave device 144 is configured to transmit the firmware $D_4(D_2(D_3(D_1(Y_1)-3)-2)-4)$ to the slave device 14_1 via the alert-handshake control line ALERT_HAND according to the salt value S of 1, as shown in label 818. Next, the slave device 14_1 is configured to use the security code IP1 to decrypt the firmware $D_4(D_2(D_3(D_1(Y_1)-3)-2)-4)$ that removes the known salt value S of 1, so as to obtain the firmware $D_1(D_4(D_2(D_3(D_1(Y_1)-3)-2)-4))-1)$ and obtain a salt value S of 3 from the firmware $D_1(D_4(D_2(D_3(D_1(Y_1)-3)-2)-4))-1)$, as shown in label 820. And so on, until the salt value obtained by the slave device 14_1 from the decrypted firmware is 0. Therefore, the firmware $Y_1$ has completed all the required decryption processes and is restored to the firmware $X_1$, as shown in label 850. Next, the slave device 14_1 is configured to store the firmware $X_1$ in its own storage (e.g., the memory), and perform the corresponding operations according to the stored firmware X1.

Figure 9:
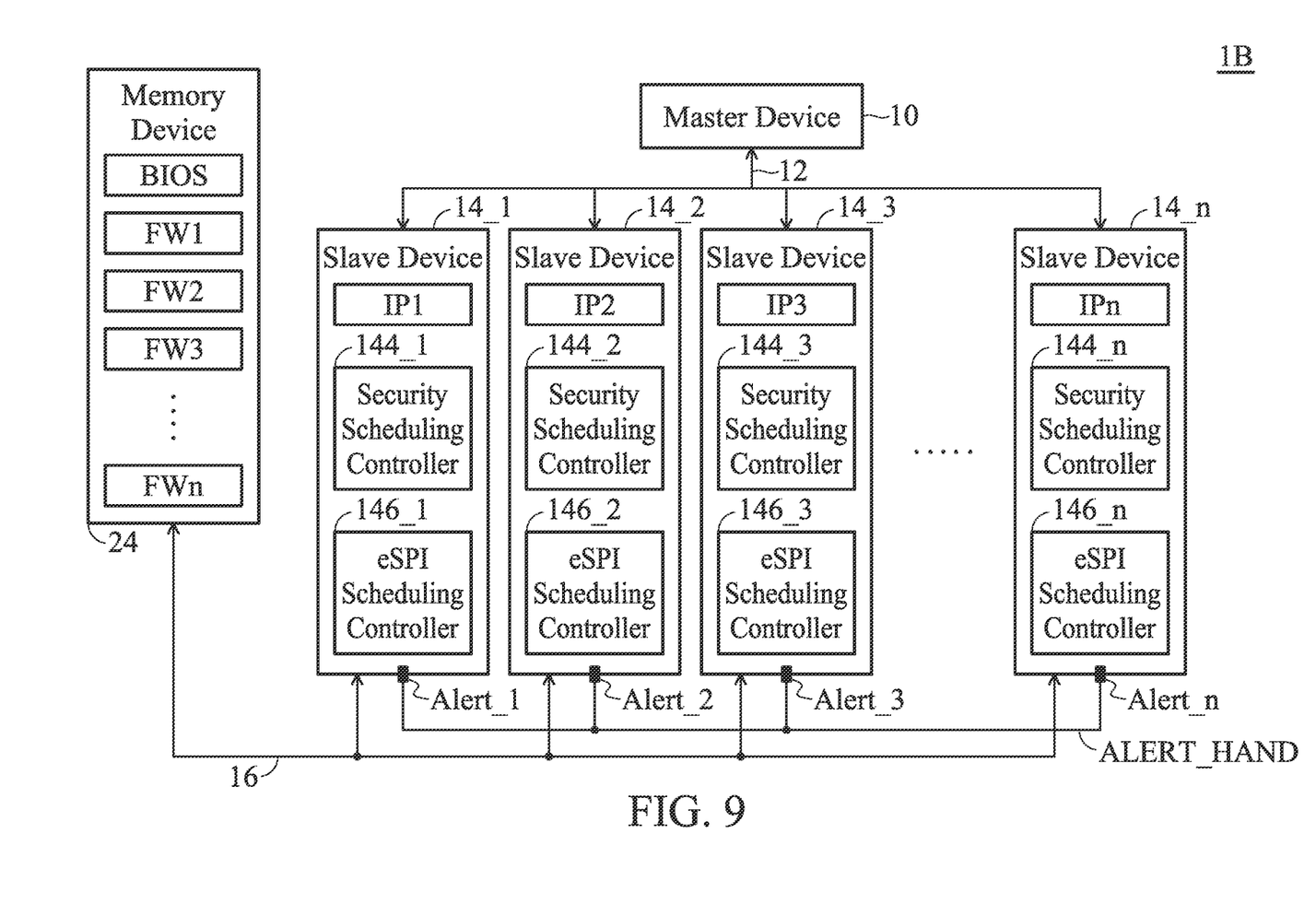
FIG. 9 shows a connection configuration of the bus system according to some embodiments of the invention.

FIG. 9 shows a connection configuration of the bus system 1B according to some embodiments of the invention. The master device 10 is electrically connected to the slave devices 14_1 through 14_n via the bus 12. As described above, the bus 12 is an eSPI bus. In addition, the slave devices 14_1 through 14_n are electrically connected to the memory device 24 through the bus 16. As described above, the memory device 24 is used to store the BIOS of the master device 10 and the firmware FW1 through FWn of the slave devices 14_1 through 14_n and other code.

Similarly, in the bus system 1B, each of the security scheduling controllers 144_1 through 144_n of the slave devices 14_1 through 14_n can execute the security scheduling control method of FIGS. 3, 5, and 7 to perform multi-decryption on the BIOS and firmware FW1 through FWn stored in the memory device 24.

Compared with the bus system 1A in FIG. 2, the master device 10 in the bus system 1B of FIG. 9 is not electrically connected to the memory device 24. Therefore, before the master device 10 has access to the BIOS, the firmware FW1 through FWn or other data stored in the memory device 24, the slave devices 14_1 through 14_n can perform multiple security decryption verifications on the BIOS and the firmware FW1 through FWn. Finally, one of the slave devices 14_1 through 14_n is configured to transmit the safety-verified BIOS to the master device 10 via the bus 12, so that the master device 10 can perform the booting process.

In the embodiments of the invention, the firmware stored in the external memory device is decrypted through multiple slave devices, which can increase the complexity of cracking the firmware. For example, it is not possible to crack the stored firmware by monitoring only a single slave device. In other words, it is necessary to know the decryption sequence required by each slave device to crack the firmware, so the security of the bus system is improved. In some embodiments, the decryption operation of each slave device may be performed simultaneously to increase the efficiency of decryption verification. Furthermore, each slave device is configured to transmit encrypted/decrypted data through the alarm-handshake control line ALERT_HAND, so the communication efficiency between the slave devices and the master device will not be affected.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A bus system, comprising:
a master device;
an enhanced serial peripheral interface (eSPI) bus;
a serial peripheral interface (SPI) bus;
a memory device electrically connected to the master device via the SPI bus; and
a plurality of slave devices electrically connected to the master device via the eSPI bus,
wherein each of the slave devices has a pin, and the pins of the slave devices are electrically connected together via a control line,
wherein each of the slave devices comprises:
a first scheduling controller configured to control the control line to a specific voltage level via the pin, so that the slave device is communicated with the master device via the eSPI bus; and
a second scheduling controller configured to control the control line to transmit or receive data via the pin, so that the slave device is communicated with the other of the slave devices via the control line,
wherein after controlling the control line to the specific voltage level by the first scheduling controller of a first slave device of the slave devices and obtaining program code from the memory device via the master device, the first slave device is configured to decrypt the program code according to a first security code, and transmit the program code decrypted by the first security code to the slave devices via the control line through the second scheduling controller of the first slave device, so that the program code decrypted by the first security code is decrypted in the slave devices according to a decryption sequence.

2. The bus system as claimed in claim 1, wherein when the first slave device receives the program code decrypted by a second security code from a second slave device of the slave devices via the control line, the first slave device is configured to re-decrypt the program code decrypted by the second security code according to the first security code, and store the re-decrypted program code as firmware of the first slave device.

3. The bus system as claimed in claim 1, wherein when a third slave device of the slave devices receives the program code from the first slave device that has been decrypted by the first security code via the control line, the third slave device is configured to decrypt the program code decrypted by the first security code according to a third security code, and transmit the program code decrypted by the third security code to the other of the slave devices via the control line according to the decryption sequence.

4. The bus system as claimed in claim 3, wherein when the first slave device receives the program code from the third slave device that has been decrypted by the third security code via the control line, the first slave device is configured to re-decrypt the program code decrypted by the third security code according to the first security code, and count the number of cycles for re-decrypting the program code using the first security code.

5. The bus system as claimed in claim 4, wherein when the number of cycles reaches a specific value, the first slave device is configured to store the re-decrypted program code as firmware of the first slave device, wherein when the number of cycles does not reach the specific value, the first slave device is configured to transmit the re-decrypted program code to the slave devices via the control line, so that the program code re-decrypted by the first security code is decrypted in the slave devices according to the decryption sequence.

6. The bus system as claimed in claim 1, wherein the first slave device is configured to obtain a first salt value from the program code decrypted by the first security code, and to transmit the program code decrypted by the first security code to the slave device corresponding to the first salt value via the control line, wherein when the first slave device receives the program code that has been decrypted by a second security code from a second slave device of the slave devices via the control line, the first slave device is configured to re-decrypt the program code decrypted by the second security code according to the first security code to obtain a second salt value.

7. The bus system as claimed in claim 6, wherein when the second salt value is 0, the first slave device is configured to store the re-decrypted program code as firmware of the first slave device, and when the second salt value is not equal to 0, the first slave device is configured to transmit the re-decrypted program code to the slave device corresponding to the second salt value via the control line.

8. The bus system as claimed in claim 1, wherein the first slave device is configured to use a triple data encryption algorithm, a polyalphabetic cipher algorithm, or a salt encryption algorithm to decrypt the program code.

9. A bus system, comprising:
a master device;
an enhanced serial peripheral interface (eSPI) bus;
a plurality of slave devices electrically connected to the master device through the eSPI bus;
a serial peripheral interface (SPI) bus; and
a memory device electrically connected to the slave devices via the SPI bus,
wherein each of the slave devices has a pin, and the pins of the slave devices are electrically connected together via a control line,
wherein each of the slave devices comprises:
a first scheduling controller configured to control the control line to a specific voltage level via the pin, so that the slave device is communicated with the master device via the eSPI bus; and
a second scheduling controller configured to control the control line to transmit or receive data via the pin, so that the slave device is communicated with the other of the slave devices via the control line,
wherein after controlling the control line to the specific voltage level by the first scheduling controller of a first slave device of the slave devices and obtaining program code from the memory device, the first slave device is configured to decrypt the program code according to a first security code, and transmit the program code decrypted by the first security code to the slave devices via the control line through the second scheduling controller of the first slave device, so that the program code decrypted by the first security code is decrypted in the slave devices according to a decryption sequence.

10. The bus system as claimed in claim 9, wherein when the first slave device receives the program code decrypted by a second security code from a second slave device of the slave devices via the control line, the first slave device is configured to re-decrypt the program code decrypted by the second security code according to the first security code, and transmit the re-decrypted program code to the master device via the eSPI bus to serve as a basic input and output system (BIOS) of the master device.

11. The bus system as claimed in claim 9, wherein when the first slave device receives the program code decrypted by a second security code from a second slave device of the slave devices via the control line, the first slave device is configured to re-decrypt the program code decrypted by the second security code according to the first security code, and store the re-decrypted program code as firmware of the first slave device.

12. The bus system as claimed in claim 9, wherein when a third slave device of the slave devices receives the program code from the first slave device that has been decrypted by the first security code via the control line, the third slave device is configured to decrypt the program code decrypted by the first security code according to a third security code, and transmit the program code decrypted by the third security code to the other of the slave devices via the control line according to the decryption sequence.

13. The bus system as claimed in claim 12, wherein when the first slave device receives the program code from the third slave device that has been decrypted by the third security code via the control line, the first slave device is configured to re-decrypt the program code decrypted by the third security code according to the first security code, and count the number of cycles for re-decrypting the program code using the first security code.

14. The bus system as claimed in claim 13, wherein when the number of cycles reaches a specific value, the first slave device is configured to transmit the re-decrypted program code to the master device via the eSPI bus to serve as a basic input and output system (BIOS) of the master device, wherein when the number of cycles does not reach the specific value, the first slave device is configured to transmit the re-decrypted program code to the slave devices via the control line, so that the program code re-decrypted by the first security code is decrypted in the slave devices according to the decryption sequence.

15. The bus system as claimed in claim 13, wherein when the number of cycles reaches a specific value, the first slave device is configured to store the re-decrypted program code as firmware of the first slave device, wherein when the number of cycles does not reach the specific value, the first slave device is configured to transmit the re-decrypted program code to the slave devices via the control line, so that the program code re-decrypted by the first security code is decrypted in the slave devices according to the decryption sequence.

16. The bus system as claimed in claim 9, wherein the first slave device is configured to obtain a first salt value from the program code decrypted by the first security code, and to transmit the program code decrypted by the first security code to the slave device corresponding to the first salt value via the control line, wherein when the first slave device receives the program code that has been decrypted by a second security code from a second slave device of the slave devices via the control line, the first slave device is configured to re-decrypt the program code decrypted by the second security code according to the first security code to obtain a second salt value.

17. The bus system as claimed in claim 16, wherein when the second salt value is 0, the first slave device is configured to transmit the re-decrypted program code to the master device via the eSPI bus to serve as a basic input and output system (BIOS) of the master device, and when the second salt value is not equal to 0, the first slave device is configured to transmit the re-decrypted program code to the slave device corresponding to the second salt value via the control line.

18. The bus system as claimed in claim 16, wherein when the second salt value is 0, the first slave device is configured to store the re-decrypted program code as firmware of the first slave device, and when the second salt value is not equal to 0, the first slave device is configured to transmit the re-decrypted program code to the slave device corresponding to the second salt value via the control line.

19. The bus system as claimed in claim 9, wherein the program code is a basic input output system (BIOS) of the master device or firmware of the slave devices.

20. The bus system as claimed in claim 9, wherein the first slave device is configured to use a triple data encryption algorithm, a polyalphabetic cipher algorithm, or a salt encryption algorithm to decrypt the program code.

* * * * *